United States Patent [19]

Fullmer

[11] Patent Number: 4,639,996
[45] Date of Patent: Feb. 3, 1987

[54] SCREW FASTENING METHOD

[75] Inventor: David M. Fullmer, Fairport, N.Y.

[73] Assignee: Xerox Corporation, Stamford, Conn.

[21] Appl. No.: 754,097

[22] Filed: Jul. 12, 1985

[51] Int. Cl.$^4$ .................... B23Q 17/00; B25B 23/151
[52] U.S. Cl. .......................................... 29/407; 81/470
[58] Field of Search ...................... 279/3; 81/469, 470; 29/407, 809, 706–709

[56] References Cited

U.S. PATENT DOCUMENTS

| 1,744,313 | 1/1930 | Kadow | 279/3 |
| 2,833,321 | 5/1958 | Hautau et al. | 81/469 |
| 3,449,001 | 6/1969 | Mullion | 279/3 |
| 3,746,185 | 7/1973 | Gartner et al. | 214/1 |
| 3,965,778 | 6/1976 | Aspers et al. | 81/470 |
| 3,973,434 | 8/1976 | Smith | 81/470 |
| 4,501,176 | 2/1985 | Sanders | 81/470 |

FOREIGN PATENT DOCUMENTS

| 2040681 | 1/1971 | France . | |
| 1081862 | 9/1967 | United Kingdom | 279/3 |

OTHER PUBLICATIONS

IBM Technical Disclosure Bulletin, Pub: Oct. 1981, vol. 24, No. 5, pp. 25 & 26, Author, Westermann.

Primary Examiner—Howard N. Goldberg
Assistant Examiner—Steven Nichols
Attorney, Agent, or Firm—H. Fleischer; J. E. Beck; R. Zibelli

[57] ABSTRACT

An apparatus in which a threaded fastener is automatically attached to an article. The apparatus positions the threaded fastener in contact with the article and applies a torque thereon. A signal is generated indicating the torque level. The signal is compared to preset limits. Different preset torque limits are set for tapping threads in a hole in the article and securing the fastener thereto.

6 Claims, 3 Drawing Figures

SCREW FASTENING METHOD

This invention relates generally to an apparatus for automatically attaching a threaded fastener to an article, and more particularly concerns automatically tapping threads in a hole in the article and securing the self-tapping screw thereto.

In the automatic assembly of articles, threaded fasteners or screws are employed. The torque applied to the screw is controlled. If the torque exceeds maximum limits, the screw threads may be sheared. To avoid this, a control system is employed which regulates the maximum allowable torque applied to the screw. When self-tapping screws are used, two levels of torque are required. One torque level is necessary to tap threads in the hole in the article with the other torque level being required to secure the screw to the article. Hereinbefore, only one torque level was utilized. This torque level was the torque level required to secure the screw to the article. Thus, insufficient torque was applied to the screw during the tapping operation. Alternatively, if sufficient torque were applied on the screw to tap threads in the hole in the article, the torque frequently exceeded the clamping torque required to secure the screw to the article. Thus, in a robotic assembly for fastening self-tapping screws to articles, particularly sheet material, it is necessary to control the torque applied to the screw. The control system should regulate the torque level such that the maximum allowable torque during the tapping operation is greater than the maximum allowable torque applied thereon during the clamping operation. Various types of robotic assembly systems have been devised. The following disclosures appear to be relevant:

U.S. Pat. No.: 3,746,185
Patentee: Gartner et al.
issued: July 17, 1973

French Pat. No.: 2,040,681
Inventor: Rioult
Published: Jan. 22, 1971

IBM Technical Disclosure Bulletin
Vol. 24, No. 5, Pages 25 & 26
Author: Westermann
Published: October, 1981

The relevant portions of an object foregoing disclosures may be briefly summarized as follows:

Gartner et al. describes an object handling aid utilizing a vacuum operated counter balance for lifting heavy objects. The aid includes a vacuum torque and a vacuum operated counter balance which is operational only when the torque engages an object to be lifted. The counter balance has a piston connected to a lifting arm and a vacuum operated valve. The valve is controlled by the vacuum torque.

Rioult discloses an apparatus for gripping and transporting light objects. The object lies against the first end of a suction tube having a vacuum applied thereon. The suction tube is then moved to position the object against an article to which it is permanently fused.

Westermann describes a pressure sensing device employing a vacuum or pressure sensing switch. The switch is utilized to signal the successful pickup of a part by a robotic vacuum pick-up head. A signal is transmitted to a computer which controls the robotic pick-up head.

Pursuant to the features of the present invention, there is provided an apparatus for automatically attaching a threaded fastener to an article. The apparatus includes means for holding releasably the threaded fastener adjacent a hole in the article. Means apply a torque on the holding means. The torque applying means generates a signal indicative of the torque being applied on the holding means. Means, responsive to the signal from the torque applying means, control the torque applying means so that the torque applied on the holding means does not exceed a first pre-determined level as the threaded fastener taps threads in a hole in the article and a second pre-determined level after the threads have been tapped in the hole during the securing of the threaded fastener to the article.

In accordance with another aspect of present invention, there is provided a method of automatically attaching a threaded fastener to an article. This includes the steps of holding releasably the threaded fastener in contact with the article. Thereafter, a torque is applied on the threaded fastener and a signal generated indicative of the torque being applied thereto. The torque applied on the threaded fastener is controlled in response to the signal indicative thereof so that the applied torque does not exceed a first pre-determined level as the threaded fastener taps threads in a hole in the article and a second pre-determined level after the threads have been tapped in the hole during the securing of the threaded fastener the article.

Other aspects of the present invention will become apparent as the following description proceeds and upon reference to the drawings, in which.

While the present invention will hereinafter be described in connection with a preferred embodiment thereof, it will be understood that it is not intended to limit the invention to that embodiment. On the contrary, it is intended to cover all alternatives, modifications, and equivalents that may be included within the spirit and scope of the invention as defined by the appended claims.

Figure 1:
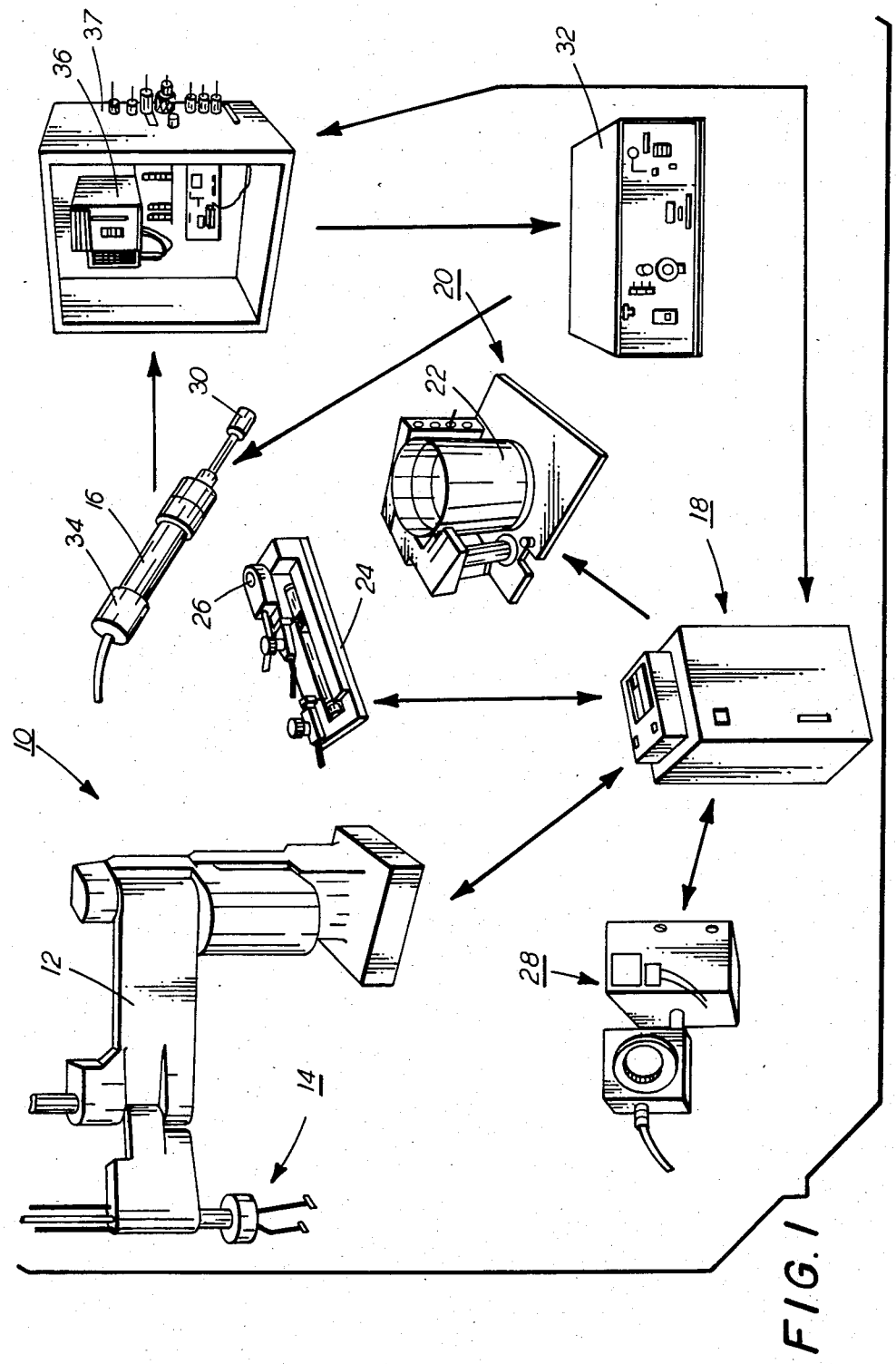
FIG. 1 is a schematic perspective view depicting the various elements of the apparatus for automatically attaching the threaded fastener to the article.

For a general understanding of the features of the present invention, reference is made to the drawings. In the drawings, like reference numerals have been used throughout to designate identical elements. FIG. 1 schematically depicts the various components of the screw fastening assembly of the present invention therein. It will become evident from the following discussion that this system is suited for use in a wide variety of operations, and is not necessarily limited in its application to the particular usage described herein.

As shown in FIG. 1, the screw fastening assembly employs a standard commercial robot 10 having a rotatably mounted arm 12 having a piston 14 adapted to move in an upwardly and downwardly direction. A screw driver, indicated generally by the reference numeral 16, is mounted on slides. The movement of robot 10 is controlled by a robot controller, indicated generally by the reference numeral 18. A screw feeder 20 is mounted on a table. Screw feeder 20 has a container 22 storing a supply of self-tapping screws therein. Container 22 is coupled to the advancing mechanism, indicated generally by the reference numeral 24, which transports successive screws, in seriatim, to the screw pickup point 26. A vacuum unit, indicated generally by the reference numeral 28, is mounted on robot arm 12. Vacuum unit 28 is coupled to screw driver 16. As screw driver 16 is positioned over screw pickup point 26, a vacuum is applied to the bit 30 thereof. This causes the screw at screw pickup point 26 to be secured releasably to bit 30. Power supply 32 is coupled to screw driver 16 to energize motor 34 thereon. The electrical current indicative of the torque applied to bit 30 having the threaded fastener secured releasably therein, is transmitted to signature analysis cube 36 in enclosure 37. Signature analysis cube 36 is a controller which contains an algorithm for comparing the measured electrical current or torque to the maximum allowable torque or the desired torque profile. By way of example, the output from the signature analysis cube 36 is an on/off signal transmitted to robot controller 18 so as to energize and de-energize the operation of the system.

In operation, robot 10 positions screw driver 16 over a threaded fastener or screw located at screw pickup point 26. Vacuum system 28 is turned on and magnetic piston 40 (FIG. 2) slides screw driver 16 downwardly until bit 30 is over screw pickup point 26. Bit 30 picks up the screw. At this time, screw driver 16 is rotating to provide alignment between the screw and bit 30. Upon receipt of the signal from the vacuum system, indicating that the screw has been picked up, magnetic piston 40 slides screw driver 16 upwardly. Movement of piston 40 is verfied by reed switches, which turn off screw driver 16. Robot 10 then rotates arm 12 to position screw driver 16 at the hole location and sends a signal to signature analysis cube 36 to begin the rotation and monitoring of the screw. Magnetic piston 40 then slides screw driver 16 downwardly to position the screw in bit 30 adjacent the hole in the article to be threaded. Signature analysis cube 36 signals the robot when fastening is complete by informing it if a good or bad joint was created, at which time, the screw driver is de-energized. Magnetic piston 40 then slides screw driver 16 upwardly. This movement is confirmed by monitoring a reed switch. The cycle then repeats for the next successive screw. Signature analysis cube 36 receives sensory information about the fastening by the current required to drive the screw with electrical motor 34. Thus, signature analysis cube 36 receives a signal which is approximately proportional to the torque applied on the screw. A rotary encoder 46 (FIG. 2) mounted on screw driver 16 provides rotational information indicative of the angle through which the threaded fastener has rotated. Thus, signature analysis cube 36 has point by point information of the torque applied on the threaded fastener as a function of the angle through which the threaded fastener has been rotated. Signature analysis cube 36 includes a program storing information indicative of the desired torque profile. In this way, the torque is compared to the desired torque and an error signal generated. The error signal, transmitted from signature analysis cube 36, turns the system on or off. In this way, the torque applied to fastener 30 is controlled.

Figure 2:
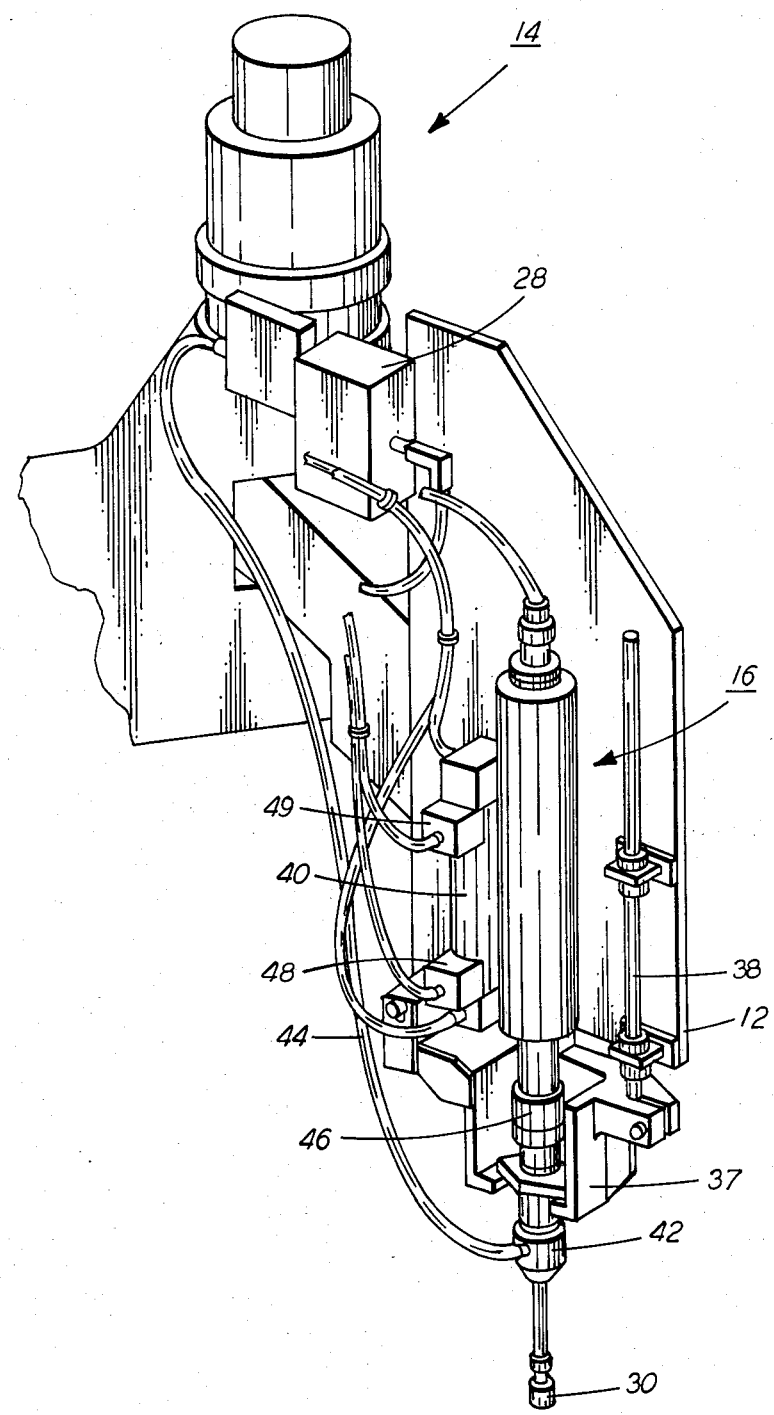
FIG. 2 is a fragmentary perspective view showing the robotic arm, screw driver and vacuum system employed in the FIG. 1 apparatus.

Referring now to FIG. 2, there is shown a fragmentary perspective view indicating the details of the screw fastening assembly. Screw driver 16 is mounted in a bracket 37 which, in turn, is mounted on slides 38 secured fixedly to the frame of robot arm 12. The vertical movement of screw driver 16 is regulated by air cushion magnetic piston 40. Piston 40 is connected to screw driver 16 so as to slide it in an upwardly direction and downwardly direction in the vicinity of the article arranged to have the fastener secured thereto. Bit 30 has a hole bored therethrough and is secured to vacuum adapter 42 mounted on screw driver 16. Conduits or flexible lines 44 coupled vacuum adapter 42 to vacuum unit 28. Rotary encoder 46 is also mounted on screw driver 16. Switches 48 and 49 indicate the upward and downward movement of screw driver 16. Preferably, encoder 46 is a commercially available encoder sold by the Hewlett Packard Corporation under Model No. HEDS-5000. This encoder is a high resolution incremental optical encoder having a light emitting diode and a lens to transmit collimated light from a module through a precision metal code wheel and phase plate onto a bifurcated detector lens. The light is focused on two pairs of closely spaced integrated detectors which output two square wave signals. The code wheel has 500 equally spaced apertures around its circumference. Thus, a signal is generated for each 0.72 degrees of angular rotation. This signal indicates the angular position of bit 30 which, in turn, corresponds to the angular position of the screw secured releasably therein. As motor 34 generates an electrical current it applies a torque on bit 30. The electrical current is proportional to this torque. Encoder 46 generates an electrical signal indicative of the angular rotation of bit 30. Both of these signals are transmitted to signature analysis cube 36. In this way, signature analysis cube 36 has information as to the magnitude of the torque being applied to the threaded fastener and the angle through which threaded fastener has been rotated. Preferably, screw driver 16 is an electric screw driver manufactured by the Jurgens Corporation, as Model No. H10SCL-861A. However, one skilled in the art will recognize that any suitable type of screw driver may be employed as long as the torque output is capable of being monitored. Vacuum system 28 is preferably a vacuum generator manufactured by the Myotoku Limited Corporation, under Model No. CVA-Convum-V-D.

In operation, there is a self-tapping region which is initiated when the screw fastener is position adjacent the hole in the article. This is defined as the angular rotation through which the screw rotates from the turn on to the region wherein tapping is completed. Within this region, signature analysis cube 36 monitors the torque against a high torque tapping limit set point until the appropriate number of angle pulses are seen designating the end of the tapping region. Thus, the electrical signal from the motor 34 is continually monitored as a measure of the torque and compared to the peak allowable tapping torque. Simultaneously therewith, the electrical signal output from encoder 46 is also monitored to indicate the angular rotation of the threaded fastener. After the threaded fastener has rotated through the requisite number of degrees, indicating the end of the tapping region, the peak torque level is reset for the fastening operation. If the tapping torque is exceeded in this region, signature analysis cube 36 will indicate this condition in a display. At initiation of the second region, i.e. the fastening region, signature analysis cube 36 continues to monitor the current from motor 34 and the pulse signals from encoder 46. This will continue until signature analysis cube 36 detects that the monitored torque has reached a desired set point after fastener 30 has rotated through a desired angular rotation. In the event that the torque level exceeds pre-determined peak torque values for fastening, signature analysis cube 36 will so indicate. If the peak torque levels are exceeded either during either tapping or fastening, signature analysis cube 36 generates a signal to indicate that to robot controller 18 which de-energizes the entire system. The foregoing is more clearly shown in FIG. 3 which depicts the typical torque versus rotation plot for a fastener. A suitable signature analysis cube is manufactured by the Cutler Hammer Division of Eaton Corporation under Model No. DPC322. However, this signature analysis cube has to be modified to account for the tapping torque region inasmuch as the presently available commercial signature analysis cube only monitors the fastening region.

The computer program of the Model No. DPC 322 signature analysis cube is modified by adding the lines of code thereto. The program modification listing may be found at the end of the description prior to the claims.

Figure 3:
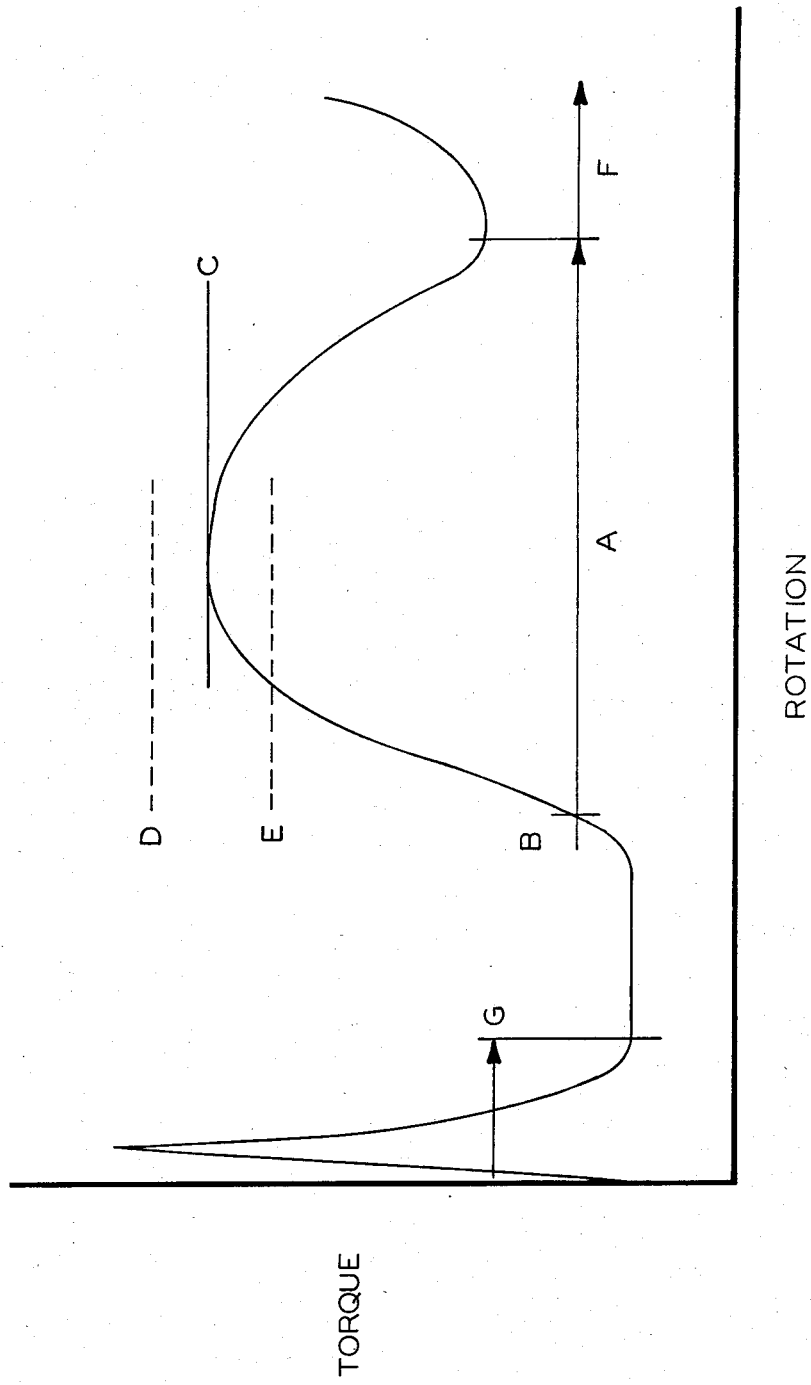
FIG. 3 is a torque curve depicting the torque profile applied to the threaded fastener.

Referring now to FIG. 3, there is shown a typical torque versus rotation signature of a self-tapping screw. As depicted thereat, a tapping region is defined by pre-programming a specified number of degrees of rotation after a threshhold torque input value, B, has been reached. The peak tapping torque, C, is recorded and compared against pre-programmed high, D and low, E, torque limits. Upon completion of the tapping region, A, the fastening operation, region F, is monitored and controlled. Inasmuch as the torque signal is derived from a current sensor on an electric motor, a delay is provided to permit the current spike to decay during motor startup, region G. Thus, the modification to the commercially available signature analysis cube includes adding an algorithm thereto which provides for screw tapping as well as screw fastening. In this way, the system is capable of being employed with self-tapping screws wherein the tapping torque requirements are higher than the fastening torque requirements. Hence, the peak torque during the tapping operation is higher than the peak allowable torque during the fastening operation. A system of this type permits the use of self-tapping screws rather than requiring screw holes to be pre-tapped prior to the threading operation.

In recapitulation, the screw fastening assembly of the present invention enables a self-tapping screw to tap a hole in an article and fasten a screw therein automatically. The system monitors the torque applied on the screw as a function of the angular rotation thereof. In the tapping region, the permissable peak torque is higher than the permissable peak torque in the fastening region. This simplifies the assembly and fastening of parts to one another and eliminates the requirement of pre-tapping a hole in an article prior to the insertion of a fastener therein.

It is, therefore, evident that there has been provided in accordance with the present invention, a screw fastening apparatus that fully satisfies the aims and advantages hereinbefore set forth. While this invention has been described in conjunction with a specific embodiment thereof, it is evident that many alternatives, modifications and variations will be apparent to those skilled in the art. Accordingly, it is intended to embrace all such alternatives, modifications and variations as fall within the spirit and broad scope of the appended claims.

| | | | PROGRAM LISTING MODIFICATIONS | | | |
|---|---|---|---|---|---|---|
| | =0046 | 122 | MXPTTK | EQU | 46H | 35-LIMIT-MAX PEAK TAP TORQUE |
| | | 123 | * | | | |
| | =0048 | 124 | MNPTTK | EQU | 48H | 36-LIMIT- MIN PEAK TAP TORQUE |
| | | 125 | * | | | |
| | =004A | 126 | DTWAIT | EQU | 4AH | 78-SET POINT - DELAY FOR SELF TAPPERS |
| | | 127 | * | | | |
| | =004C | 128 | PKTPTK | EQU | 4CH | 76-PEAK TAPPING TORQUE OBSERVED |
| E00D | 25 | 533 | FCB | | 37 | TAPPING DELAY ANGLE |
| | | 3515 | INCLUDE UPBTW.A68 | | | |
| | | 3516 | * MODULE NAME: | | | |
| | | 3517 | | | | |
| | | 3518 | * UPDATE BINARY TAP WAIT VALUE | | | |
| | | 3519 | | | | |
| | | 3520 | * MODULE DESCRIPTION: | | | |
| | | 3521 | | | | |
| | | 3522 | * THIS MODULE RETREIVES THE TAP DELAY VALUE FROM THE CURRENT | | | |
| | | 3523 | * DATABASE, CONVERTS IT TO BINARY AND PLACES THE NEW VALUE | | | |
| | | 3524 | * IN [BTWAT]. | | | |
| | | 3525 | * | | | |
| | | 3526 | * | | | |
| | | 3527 | * CALLING SEQUENCE: | | | |
| | | 3528 | * | | | |
| | | 3529 | * A,B,X   UNDEFINED | | | |
| | | 3530 | * | | | |
| | | 3531 | *     JSR UPBTW | | | |
| | | 3532 | * | | | |
| | | 3533 | * A,B,X   UNDEFINED | | | |
| | | 3534 | * | | | |
| | | 3535 | * | | | |
| | | 3536 | * PSEUDO CODE: | | | |
| | | 3537 | * | | | |
| | | 3538 | * LOAD DATABASE POINTER | | | |
| | | 3539 | * LOAD OFFSET TO DECIMAL DELAY VALUE | | | |
| | | 3540 | * CALL "BINARY CODED DECIMAL TO INTEGER | | | |
| | | 3541 | * STORE RESULT IN [BTWAT] | | | |
| | | 3542 | * RETURN | | | |
| | | 3544 | | | | |
| | =E97C | 3545 | UPBTW | EQU | * | |
| E97C | FE 020D | 3546 | | LDX | MEMDB | LOAD POINTER TO CURRENT DATABASE |
| E97F | A6 4A | 3547 | | LDAA | DTWAIT,X | LOAD OFFSET TO DATA DESIRED... |

-continued

PROGRAM LISTING MODIFICATIONS

```
E981   E6 4B      3548          LDAB   DTWAIT+1,X   ...
E983   BD FBSC    3549          JSR    RBCD2I       DO THE CONVERSION
E986   B7 01E6    3550          STAA   BTWAT        STORE THE RESULT...
E989   F7 01E7    3551          STAB   BTWAT+1      ...
E98C   39         3552          RTS
                  3553          LOCAL
EF7B   BD F0AD    5141          JSR    TAPDLY       DELAY TO ALLOW FOR SELF TAPPERS
EF7E   B6 020F    5142          LDAA   MISTAP       CHECK FOR MISTAP CONDITION
EF81   27 03      5143          BEQ    TRSLOP       NO ERROR OCCURRED
                  5326   INCLUDE TAPDLY.A68
                  5327
                  5328   *
                  5329   *   SELF TAPPING SCREW DELAY MODULE.
                  5330   *
                  5331   *   THIS MODULE DELAYS THE FASTENING OPERATION FROM
                  5332   *   RECOGNIZING THRESHOLD TORQUE FROM A SPECIFIED
                  5333   *   DELAY ANGLE. THIS ANGLE USED IS RETRIEVED FROM
                  5334   *   THE BINARY DATABASE AND MULTIPLIED BY 10 (TEN)
                  5335   *   TO ACHIEVE A DELAY ANGLE FROM 0 TO 9990 DEGREES.
                  5336   *
                  5337   *
                  5338   *   CALLING SEQUENCE:
                  5339   *
                  5340   *   A,B,X   UNDEFINED
                  5342   *       JSR TAPDLY
                  5343   *
                  5344   *   A,B,X UNDEFINED
                  5345   *
                  5346   *   VARIABLES USED:
                  5347   *
                  5348   *   BTWAT           BINARY DELAY ANGLE
                  5349   *   STPVAL          COUNTER VALUE THAT STOPS DELAY SEQUENCE.
                  5350   *                   (0FFFF - BTWAT*10)
                  5351   *   ANALOG          LOCATION OF A/D CONVERTER.
                  5352   *   TORKIN          PEAK TORQUE, RESET AFTER DELAY IS CONCLUDED.
                  5353   *   FNLTRK          BINARY VALUE OF TORQUE FOR TURN CONTROL.
                  5354   *   MEMDB           CURRENT INDEX TO DECIMAL DATABASE.
                  5355   *   DLYPLS          BINARY NUMBER OF PULSES TO DELAY FOR TAP.
                  5356   *
                  5357   *   PSUEDO CODE:
                  5358   *
                  5359   *   CLEAR MISTAP INDICATOR
                  5360   *   IF DELAY IS ZERO RETURN AND DO FASTENING
                  5361   *   CHANGE DEGREES TO PULSES
                  5362   *   RESET ANGLE COUNTER TO 0FFFFH
                  5363   *   CHANGE PULSES TO A STOP VALUE
                  5364   *   DO WHILE DELAY IS IN EFFECT
                  5365   *   READ A/D AND STORE PEAK VALUE
                  5366   *   IF TORQUE FINAL TORQUE
                  5367   *   RETURN
                  5368   *   END IF
                  5369   *   IF CYCLE-ON IS LOST
                  5370   *   SET CYCLE INCOMPLETE
                  5371   *   SET MISTAP FLAG
                  5372   *   END IF
                  5373   *   END DO WHILE
                  5374   *   IF TAP TORQUE EXCEEDS MAX TAP TORQUE
                  5375   *   SET PEAK TORQUE TOO HIGH ALARM
                  5376   *   SET CYCLE INCOMPLETE
                  5377   *   SET RATES TO ZERO
                  5378   *   END IF
                  5379   *   IF TAP TORQUE LESS THAN MINIMUM TAP TORQUE
                  5380   *   SET PEAK TORQUE TOO LOW ALARM
                  5381   *   SET CYCLE INCOMPLETE ALARM
                  5382   *   SET RATES TO ZERO
                  5383   *   END IF
                  5384   *   IF LET MODE
                  5385   *   LOAD SOFTWARE COUNTER
                  5386   *   END IF
                  5387   *   SET TORQUE TO ZERO
                  5388   *   RETURN
                  5389
                  5390
                  5391
                  5392   *
                  5394   *
       =F0AD      5395   TAPDLY  EQU*
F0AD   86 00      5396           LDAA   #0
F0AF   B7 020F    5397           STAA   MISTAP
F0B2   FE 01E6    5398           LDX    BTWAT
F0B5   26 01      5399           BNE    10S
```

PROGRAM LISTING MODIFICATIONS -continued

| Addr | Bytes | Line | Label | Instruction | Comment |
|---|---|---|---|---|---|
| F0B7 | 39 | 5400 | | RTS | NO DELAY OR COMPARISONS IF ZERO |
| | | 5401 | * | | |
| | | 5402 | * | | |
| =F0B8 | | 5403 | 10S | EQU* | DEGREES MUST BE PULSES |
| F0B8 | CE 01E6 | 5404 | | LDX #BTWAT | |
| F0BB | BD FE95 | 5405 | | JSR DG2PLS | |
| F0BE | FE 0218 | 5406 | | LDX PROD1 | |
| F0C1 | FF 01 EA | 5407 | | STX DLYPLS | STORE PULSES IN ANGLE DELAY |
| | | 5408 | * | | |
| | | 5409 | * | * | |
| F0C4 | CE FFFF | 5410 | | LDX #0FFFFH | |
| F0C7 | FF F52 | 5411 | | STX PTML1 | RELOAD ANGLE COUNTER. |
| | | 5412 | * | | |
| | | 5413 | * | | |
| F0CA | 4F | 5414 | | CLRA | SET HIGH BYTE OF MULTIPLIER TO 0 |
| F0CB | C6 0A | 5415 | | LDAB #10 | LOAD LOW BYTE OF MULTIPLIER. |
| F0CD | CE 01EA | 5416 | | LDX #DLYPLS | LOAD ADDRESS OF MULTIPLICAND. |
| F0D0 | BD FA02 | 5417 | | JSR MULT16 | DO THE MULTIPLY. |
| | | 5418 | * | * | |
| | | 5419 | * | WITH RESULT IN PROD0-PROD3,LOAD STPVAL WITH | |
| | | 5420 | * | VALUE THAT WILL BE USED TO STOP THE DELAY. | |
| | | 5421 | * | | |
| F0D3 | 86 FF | 5422 | | LDAA #0FFH | INIT FOR SUBTRACTION. |
| F0D5 | 16 | 5423 | | TAB | INIT 'B' ALSO. |
| F0D6 | F0 0219 | 5424 | | SUBB PROD0 | SUBTRACT LOW BYTES |
| F0D9 | F7 01E9 | 5425 | | STAB STPVAL+1 | STORE LOW BYTE RESULT. |
| F0DC | B2 0218 | 5426 | | SBCA PROD1 | |
| F0DF | B7 01E8 | 5427 | | STAA STPVAL | STORE HI BYTE OF RESULT. |
| | | 5428 | * | * | |
| | | 5429 | * | READ TORK FROM A/D AND KEEP PEAK STORED IN | |
| | | 5430 | * | TORKIN. VERIFY TORKIN DOES NOT EXCEED FINAL TORQUE. | |
| | | 5431 | * | * | |
| F0E2 | F6 7FD1 | 5432 | STDLY | LDAB ANALOG | READ CURRENT TORQUE |
| F0E5 | B6 7FD0 | 5433 | | LDAA ANALOG−1 | |
| F0E8 | 53 | 5434 | | COMB | |
| F0E9 | 43 | 5435 | | COMA | |
| F0EA | 84 03 | 5436 | | ANDA #03 | |
| F0EC | B1 01D0 | 5437 | | CMPA TORKIN | |
| F0EF | 25 0D | 5438 | | BCS STILOK | A/D TORK IS NOT PEAK TORK. |
| F0F1 | 26 05 | 5439 | | BNE 30S | |
| F0F3 | F1 01D1 | 5440 | | CMPB TORKIN+1 | CHECK LOW BYTES IF NECESSARY. |
| F0F6 | 23 06 | 5441 | | BLS STILOK | A/D TORK IS NOT PEAK TORK. |
| | | 5442 | * | * | |
| | | 5443 | * | IF A/D IS PEAK TORK RECORD | |
| | | 5444 | * | | |
| =F0F8 | | 5445 | 30S | EQU* | DO NOT LET TAP TORK EXCEED FINAL |
| F0F8 | B7 01D0 | 5446 | | STAA TORKIN | |
| F0FB | F7 01D1 | 5447 | | STAB TORKIN+1 | |
| =F0FE | | 5448 | STILOK | EQU* | |
| | | 5449 | * | | |
| | | 5450 | * | THIS SECTION ALLOWS DIGITAL CONTROL TO EXIT THE DELAY. | |
| | | 5451 | * | NOTE THAT IF T.E.T. OCCURS IT WILL ALSO EXIT THE DELAY. | |
| | | 5452 | * | * | |
| F0FE | BD E4FC | 5453 | | JSR LTRT | TEST IF STILL IN CYCLE |
| F101 | 26 20 | 5454 | | BNE 10S | 'A' CONTAINS CYCLE INDICATION |
| | | 5455 | * | | |
| F103 | BD F332 | 5456 | | JSR STOPFC | |
| F106 | CE E01E | 5457 | | LDX #CTLICM | CYCLE INCOMPLETE SET (ONLY) |
| F109 | BD FC90 | 5458 | | JSR ALARM | |
| F10C | 86 0B | 5459 | | LDAA #11 | SET MISTAP TO KEEP FROM . . . |
| F10E | B7 020F | 5460 | | STAA MISTAP | . . . EVALUATING FASTENING. |
| F111 | CE 0000 | 5461 | | LDX #0 | |
| F114 | FF 01F9 | 5462 | | STX COUNT1 | |
| | | 5463 | * | | |
| F117 | CE E104 | 5464 | | LDX #0E104H | |
| F11A | FF 7F56 | 5465 | | STX PTML3 | |
| F11D | 86 C2 | 5466 | | LDAA #0C2H | |
| F11F | B7 7F50 | 5467 | | STAA PTMCR3 | |
| | | 5468 | * | | |
| F122 | 39 | 5469 | | RTS | RETURN TO PFASTA |
| | | 5470 | * | * | |
| | | 5471 | * | CHECK ANGLE PULSE COUNTER TO SEE IF DELAY HAS EXPIRED. | |
| | | 5472 | ° | | |
| =F123 | | 5473 | 10S | EQU* | |
| | | 5474 | * | | |
| F123 | B6 7F52 | 5475 | | LDAA PTMC1 | |
| F126 | B1 01E8 | 5476 | | CMPA STPVAL | |
| F129 | 22 B7 | 5477 | | BHI STDLY | |
| F12B | 01 | 5478 | | NOP | |
| F12C | F6 7F53 | 5479 | | LDAB PTMC1+1 | |
| F12F | F1 01E9 | 5480 | | CMPB STPVAL+1 | |

PROGRAM LISTING MODIFICATIONS

```
F132   2A AE     5481           BPL STDLY
                 5482
                 5483  *        DELAY HAS EXPIRED, CHECK UPPER AND LOWER LIMITS
                 5484  *        ON PEAK TORK. SET ALARM CONDITIONS IF REQUIRED.
                 5485  *        STOP THE CYCLE IF LIMITS EXCEEDED.
                 5486  *        *
F134   B6 01D0   5487           LDAA TORKIN          STORE TORQUE IN DECIMAL DB
F137   F6 01D1   5488           LDAB TORKIN+1
F13A   BD F453   5489           JSR CMPTRK
F13D   FE 020D   5490           LDX MEMDB
F140   A7 4C     5491           STAA PKTPTK,X
F142   E7 4D     5492           STAB PKTPTK+1,X
F144   36        5493           PSHA
F145   86 46     5494           LDAA #MXPTTK
F147   BD FD46   5495           JSR SETIDX
F14A   32        5496           PULA
F14B   BD FB9D   5497           JSR CMPMAX            COMPARE AGAINST MAX LIMIT
F14E   24 52     5498           BCC 15S
                 5499  *        *
                 5500  *        CARRY SET, LOAD RATES WITH ZERO AND
                 5501  *        STOP THE CYCLE
                 5502  *        *
                 5503  *
F150   4F        5504           CLRA
F151   FE 020D   5505           LDX MEMDB
F154   A7 22     5506           STAA DLOWRT,X
F156   A7 23     5507           STAA DLOWRT+1,X
F158   A7 2C     5508           STAA DUPRT,X
F15A   A7 2D     5509           STAA DUPRT+1,X
F15C   86 4C     5510           LDAA #76
F15E   CE 7F83   5511           LDX #DSPY13
F161   BD F7D5   5512           JSR D3HDLR
F164   86 10     5513           LDAA #10H
F166   CE 7F84   5514           LDX #DSPY20
F169   A7 00     5515   11S     STAA 0,X
F16B   08        5516           INX
F16C   8C 7F8D   5517           CPX #DSPY34+1
F16F   26 F8     5518           BNE 11S
F171   CE E02C   5519           LDX #PKT2HI
F174   BD FC90   5520           JSR ALARM
F177   CE E01E   5521           LDX #CTLICM
F17A   BD FC90   5522           JSR ALARM
F17D   BD F332   5523           JSR STOPFC
                 5524  *
F180   86 0B     5525           LDAA #11
F182   B7 020F   5526           STAA MISTAP
F185   BD E4FC   5527   14S     JSR LTRT
F188   26 FB     5528           BNE 14S
                 5529  *
F18A   B6 020C   5530           LDAA LETDI
F18D   27 70     5531           BEQ 35S
                 5532  *
F18F   CE 0000   5533           LDX #0
F192   FF 01F9   5534           STX COUNT1
                 5535  *
F195   CE E104   5536           LDX #0E104H
F198   FF 7F56   5537           STX PTML3
F19B   86 C2     5538           LDAA #0C2H
F19D   B7 7F50   5539           STAA PTMCR3
                 5540
F1A0   20 5D     5541           BRA 35S
F1A2   36        5542   15S     PSHA
F1A3   86 48     5543           LDAA #MNPTTK
F1A5   BD FD46   5544           JSR SETIDX
F1A8   32        5545           PULA
F1A9   BD FBBA   5546           JSR CMPMIN            COMPARE AGAINST MIN TAP TORQUE
F1AC   24 51     5547           BCC 35S
                 5548
F1AE   4F        5549           CLRA
F1AF   FE 020D   5550           LDX MEMDB
F1B2   A7 22     5551           STAA DLOWRT,X
F184   A7 23     5552           STAA DLOWRT+1,X
F186   A7 2C     5553           STAA DUPRT,X
F188   A7 2D     5554           STAA DUPRT+1,X
F1BA   B6 4C     5555           LDAA #76
F1BC   CE 7F83   5556           LDX #DSPY13
F1BF   BD F7D5   5557           JSR D3HDLR
F1C2   86 10     5558           LDAA #10H
F1C4   CE 7F84   5559           LDX #DSPY20
F1C7   A7 00     5560   12S     STAA 0,X
F1C9   08        5561           INX
```

|      |         |      | PROGRAM LISTING MODIFICATIONS |       |       |                                |
|------|---------|------|------|------|------|--------------------------------|
| F1CA | 8C 7F8D | 5562 |      | CPX  | #DSPY34+1 |                           |
| F1CD | 26 F8   | 5563 |      | BNE  | 12S  |                                |
| F1CF | CE E02E | 5564 |      | LDX  | #PKT2LO |                             |
| F1D2 | BD FC90 | 5565 |      | JSR  | ALARM |                               |
| F1D5 | CE E01E | 5566 |      | LDX  | #CTCICM |                             |
| F1D8 | BD FC90 | 5567 |      | JSR  | ALARM |                               |
| F1DB | BD F332 | 5568 |      | JSR  | STOPFC |                              |
|      |         | 5569 |      |      |      |                                |
| F1DE | 86 0B   | 5570 |      | LDAA | #11  | MISTAP OCCURRED                |
| F1E0 | B7 020F | 5571 |      | STAA | MISTAP |                              |
| F1E3 | BD EE4FC| 5572 | 13S  | JSR  | LTRT | DO NOT EXIT UNTIL CYCLE OFF    |
| F1E6 | 26 FB   | 5573 |      | BNE  | 13S  |                                |
|      |         | 5574 | *    |      |      |                                |
| F1E8 | B6 020C | 5575 |      | LDAA | LETDI | CHECK FOR LET MODE BEFORE....|
| F1EB | 26 01   | 5576 |      | BNE  | 16S  | ...INSERTING A LONG DELAY      |
| F1ED | 39      | 5577 |      | RTS  |      |                                |
|      |         | 5578 |      |      |      |                                |
| F1EE | CE 0000 | 5579 | 16S  | LDX  | #0   | DO ONLY IF IN LET MODE         |
| F1F1 | FF 01F9 | 5580 |      | STX  | COUNT1 |                              |
| F1F4 | CE E104 | 5581 |      | LDX  | #0E104H |                             |
| F1F7 | FF 7F56 | 5582 |      | STX  | PTML3 |                               |
| F1FA | 86 C2   | 5583 |      | LDAA | #0C2H |                               |
| F1FC | B7 7F50 | 5584 |      | STAA | PTMCR3 |                              |
|      |         | 5585 |      |      |      |                                |
| F1FF | CE 0000 | 5586 | 35S  | LDX  | #0000 |                               |
| F202 | FF 01D0 | 5587 |      | STX  | TORKIN |                              |
| F205 | 39      | 5588 |      | RTS  |      |                                |
|      |         | 5589 |      | LOCAL |     |                                |
|      |         | 9396 |      | INCLUDE DG2PLS.A68 |  |                    |
|      |         | 9637 | *    |      |      |                                |
|      |         | 9638 | *    |      |      |                                |
|      |         | 9639 | *    |      |      |                                |
|      |         | 9640 | *    |      |      |                                |
|      |         | 9641 | *    | MODULE NAME: |  |                           |
|      |         | 9642 | *    |      |      |                                |
|      |         | 9643 | *    | CONVERT DEGREES TO PULSES | | |
|      |         | 9644 | *    |      |      |                                |
|      |         | 9645 | *    | MODULE DESCRIPTION: |  |                    |
|      |         | 9646 | *    |      |      |                                |
|      |         | 9647 | *    | THIS MODULE WILL TAKE A KNOWN NUMBER OF DEGREES AND | | |
|      |         | 9648 | *    | CONVERT IT TO PULSES USING THE PULSE COUNT WEIGHT. | | |
|      |         | 9649 | *    |      |      |                                |
|      |         | 9650 | *    | CALLING SEQUENCE: |  |                      |
|      |         | 9651 | *    |      |      |                                |
|      |         | 9652 | *    | A,B UNDEFINED |  |                          |
|      |         | 9653 | *    | X POINTER TO BINARY NUMBER OF DEGREES TO BE CONVERTED | | |
|      |         | 9654 | *    |      |      |                                |
|      |         | 9655 | *    | JSR DG2PLS |  |                             |
|      |         | 9656 | *    |      |      |                                |
|      |         | 9657 | *    | A,B,X UNDEFINED |  |                        |
|      |         | 9658 | *    | PROD3-PROD0 CONTAINS PULSES |  |            |
|      |         | 9659 | *    |      |      |                                |
|      |         | 9660 | *    |      |      |                                |
|      |         | 9661 | *    | VARIABLES USED: |  |                        |
|      |         | 9662 | *    |      |      |                                |
|      |         | 9663 | *    | MEMDB POINTER TO CURRENT DATABASE |  |      |
|      |         | 9664 | *    | BPCWT BINARY PULSE COUNT WEIGHT |  |        |
|      |         | 9665 | *    | DPCWT DECIMAL PULSE COUNT WEIGHT |  |       |
|      |         | 9666 | *    | PROD3- |  |                                 |
|      |         | 9667 | *    | PROD0 RESULTS TO CONVERSION |  |            |
|      |         | 9668 | *    | TEMPA STORAGE |  |                          |
|      |         | 9669 | *    | TEMPX STORAGE |  |                          |
|      |         | 9670 | *    |      |      |                                |
|      |         | 9671 | *    |      |      |                                |
|      |         | 9673 | *    |      |      |                                |
|      |         | 9674 | *    |      |      |                                |
|      |         | 9675 | *    |      |      |                                |
|      | =FE95   | 9676 | DG2PLS | EQU | *   |                                |
| FE95 | 4F      | 9677 |      | CLRA |      |                                |
| FE96 | FF 022C | 9678 |      | STX  | TEMPX |                               |
| FE99 | 01      | 9679 |      | NOP  |      |                                |
| FE9A | 01      | 9680 |      | NOP  |      |                                |
| FE9B | 01      | 9681 |      | NOP  |      |                                |
| FE9C | FE 020D | 9682 |      | LDX  | MEMDB | LOAD DATABASE POINTER         |
| FE9F | E6 3E   | 9683 |      | LDAB | DPCWT,X | LOAD DECIMAL COUNT WEIGHT   |
| FEA1 | C4 F0   | 9684 |      | ANDB | #0F0H | EXTRACT EXPONENT FROM COUNT WEIGHT |
| FEA3 | 27 22   | 9685 |      | BEQ  | 40S  | FACTOR IS ONE                  |
| FEA5 | 2A 42   | 9686 |      | BPL  | 70S  | ERROR-FACTOR TOO LARGE         |
| FEA7 | C1 E0   | 9687 |      | CMPB | #0E0H | CHECK FOR FACTOR OF TEN       |
| FEA9 | 22 18   | 9688 |      | BHI  | 30S  |                                |
| FEAB | 27 12   | 9689 |      | BEQ  | 20S  |                                |

PROGRAM LISTING MODIFICATIONS -continued

| Address | Bytes | Line | | Label | Op | Operand | Comment |
|---|---|---|---|---|---|---|---|
| FEAD | C1 C0 | 9690 | | | CMPB | #0C0H | |
| FEAF | 22 08 | 9691 | | | BHI | 10S | |
| FEB1 | 26 36 | 9692 | | | BNE | 70S | |
| | | 9693 | * | | | | |
| | | 9694 | * | | | ASSIGN FACTOR-PLACE IN A&G REG | |
| | | 9695 | * | | | | |
| FEB3 | 86 27 | 9696 | | | LDAA | #27H | |
| FEB5 | C6 10 | 9697 | | | LDAB | #10H | |
| FEB7 | 20 10 | 9698 | | | BRA | 50S | |
| | | 9699 | * | | | | |
| =FEB9 | | 9700 | | 10S | EQU | * | |
| FEB9 | 86 03 | 9701 | | | LDAA | #03H | |
| FEBB | C6 E8 | 9702 | | | LDAB | #0E8H | |
| FEBD | 20 0A | 9703 | | | BRA | 50S | |
| | | 9704 | * | | | | |
| =FEBF | | 9705 | | 20S | EQU | * | |
| FEBF | C6 64 | 9706 | | | LDAB | #064H | |
| FEC1 | 20 06 | 9707 | | | BRA | 50S | |
| | | 9708 | * | | | | |
| =FEB3 | | 9709 | | 30S | EQU | | |
| FEC3 | C6 0A | 9710 | | | LDAB | #0AH | |
| FEC5 | 20 02 | 9711 | | | BRA | 50S | |
| | | 9712 | * | | | | |
| =FEC7 | | 9713 | | 40S | EQU | * | |
| FEC7 | C6 01 | 9714 | | | LDAB | #01 | |
| | | 9715 | * | | | | |
| | | 9716 | * | | | | |
| | | 9717 | * | | | | |
| =FEC9 | | 9718 | | 50S | EQU | * | |
| FEC9 | B7 022A | 9719 | | | STAA | TEMPA | KEEP FACTOR FOR LATER DIVISION |
| FECC | F7 022B | 9720 | | | STAB | TEMPA+1 | |
| FECF | FE 022C | 9721 | | | LDX | TMPX | LOAD POINTER TO DEGREES |
| FED2 | A6 00 | 9722 | | | LDAA | 0,X | |
| FED4 | E6 01 | 9723 | | | LDAB | 1,X | |
| FED6 | CE 01DE | 9724 | | | LDX | #BPCWT | LOAD POINTER TO CURRENT PULSE WEIGHT |
| FED9 | BD FA02 | 9725 | | | JSR | MULT16 | |
| | | 9726 | * | | | | |
| | | 9727 | * | | | | |
| FEDC | B6 022A | 9728 | | | LDAA | TEMPA | |
| FEDF | F6 022B | 9729 | | | LDAB | TEMPA+1 | |
| FEE2 | BD FA3D | 9730 | | | JSR | DIV32 | |
| FEE5 | 01 | 9731 | | | NOP | | |
| FEE6 | 01 | 9732 | | | NOP | | |
| FEE7 | 01 | 9733 | | | NOP | | |
| FEE8 | 39 | 9734 | | | RTS | | |
| | | 9735 | * | | | | |
| | | 9736 | * | | | | |
| =FEE9 | | 9737 | | 70S | EQU | * | |
| FEE9 | CE FFFF | 9738 | | | LDX | *0FFFFH | |
| FEEC | FF 0216 | 9739 | | | STX | PROD3 | SET ANSWER HIGH TO INDICATE ERROR |
| FEEF | FF 0218 | 9740 | | | STX | PROD1 | |
| FEF2 | 39 | 9741 | | | RTS | | |
| FEF3 | 01 | 9742 | | | NOP | | |
| FEF4 | 01 | 9743 | | | NOP | | |
| FEF5 | 01 | 9744 | | | NOP | | |
| FEF5 | 01 | 9745 | | | LOCAL | | |

I claim:

1. A method of automatically attaching a threaded fastener to an article, including the steps of:
   holding releasably the threaded fastener adjacent an untapped hole in the article;
   applying a torque on the threaded fastener;
   generating a signal indicative of the torque being applied on the threaded fastener; and
   controlling the torque applied on the threaded fastener in response to the signal indicative of the torque applied on the threaded fastener so that the torque applied on the threaded fastener does not exceed a first pre-determined level as the threaded fastener taps threads in the hole in the article and a second pre-determined level after the threads have been tapped in the hole during the securing of the the threaded fastener to the article wherein said step of controlling includes the step of maintaining the first pre-determined torque level at a higher level than the second pre-determined torque level.

2. A method according to claim 1, further including the steps of:
   storing a supply of threaded fasteners in a container; and
   moving a bit from a first position for obtaining one of the threaded fasteners from the container to a second position locating the threaded fastener adjacent the hole in the article.

3. A method according to claim 2, further including the step of maintaining a low pressure in the bit to hold the threaded fastener therein.

4. A method according to claim 3, further including the step of:
   measuring the angular rotation of the threaded fastener; and generating a signal indicative of the angular rotation of the threaded fastener.

5. A method according to claim 4, wherein said step of controlling includes the steps of:
   receiving the signal indicative of the angular rotation of the threaded fastener; and
   comparing the signal indicative of the torque being applied on the threaded fastener to the first pre-determined torque level over a first angular rotation of the threaded fastener and to the second pre-determined torque level over a second angular rotation of the threaded fastener.

6. A method according to claim 5, wherein said step of controlling includes the step of de-energizing the apparatus if the signal indicative of the measured torque level exceeds the first pre-determined torque level over the first angular rotation of the threaded fastener or the second pre-determined level over the second angular rotation of the threaded fastener.

* * * * *